Figure 1:
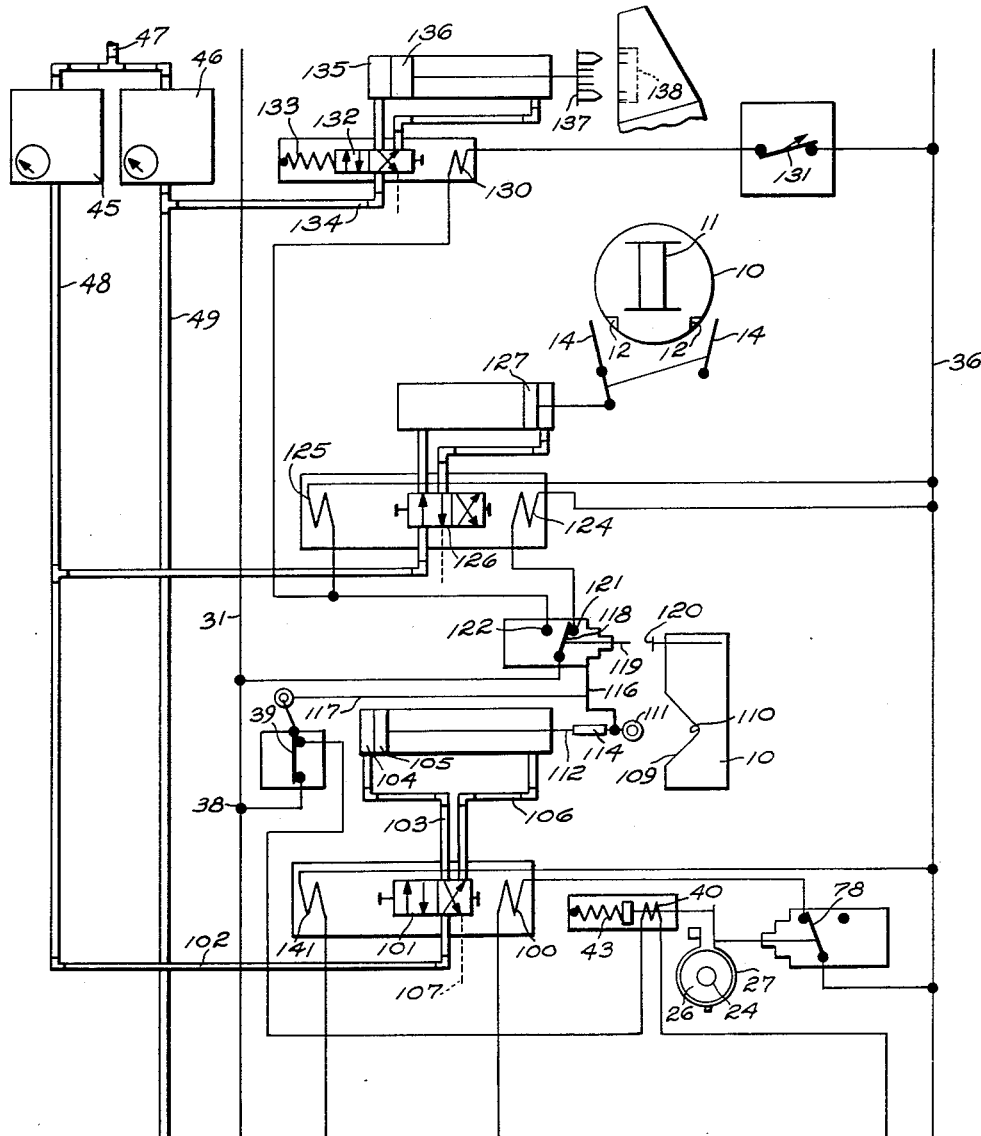

INVENTORS
C. H. CROSBY
F. WAHL
R. R. WAHLBERG

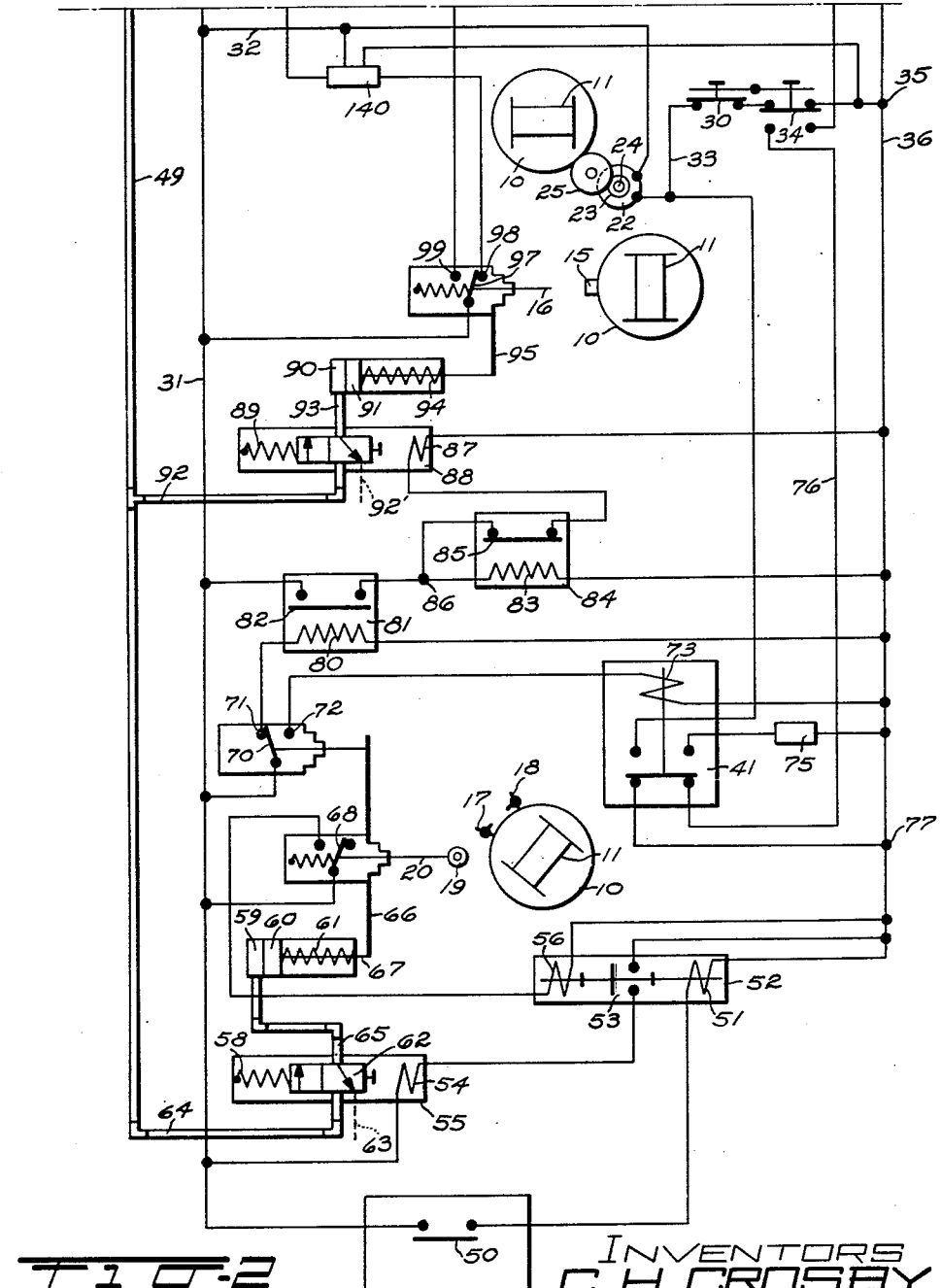

United States Patent Office 2,956,390
Patented Oct. 18, 1960

2,956,390

TAKE-UP FOR CABLE STRANDING APPARATUS

Charles H. Crosby, Cranford, Frank Wahl, North Bergen, and Roger R. Wahlberg, Bloomfield, N.J., assignors to Western Electric Company, Incorporated, New York, N.Y., a corporation of New York Filed July 9, 1959, Ser. No. 825,960

5 Claims. (Cl. 57—54)

This invention relates to control systems for cradles of cabling machines, particularly for locating cradles of take-up units of such machines at given positions for removing loaded reels therefrom and inserting empty reels therein.

In the manufacture of cables, particularly telephone cables, the cable cores are wound on reels which are rotated about their axes and supported in cradles which are rotated about axes at right angle to reel axes to produce predetermined twists in the cable cores. The weight of the reels, in each instance, is so great, particularly when loaded with cable, that it is important to stop the rotation of the cradle with the axes of the reel in a vertical position. Furthermore, in numerous cabling machines, it is necessary to lock the cradle prior to removing the reel therefrom and also to insert an electrical plug disposed externally of the cradle in a socket carried by the cradle to provide electrical energy for power means operable to remove the reel clamps to free the reel for removal from the cradle. To bring about these results efficiently, the cradle must be stopped at a given position, which may be described as a zero position, in order that all of these things may be accomplished. This stopping means cannot be brought about with the cradle rotating at the normal operating speed, therefore, the cradle must be stopped and then moved for a part of a revolution at a slower speed of approximately one and one-half revolutions per minute and during a slower rotation of the cradle, it has been found that it is possible to stop and locate the cradle at the given position.

The object of the invention is a control system which is completely automatic in its operation in moving a cradle of a cable strander to a given position for loading and unloading reels.

In accordance with the object, the invention comprises a control system for conditioning a cradle of a cable strander for unloading from and loading therein, take-up reels at a given position after stopping the cradle driven by a motor, having a brake, at a normal operating speed and under the control of circuits jointly controlled to render the brake active to stop the cradle when the motor is de-energized. The control system includes a main switch operable into closed position to drive the cradle at a slow speed and to position elements actuable by members moved by the cradle to stop the cradle while moving at the slow speed within degrees of the given position and to further move the cradle into the given position.

More specifically, after closing the main switch, the brake is released, the motor is energized at a slow speed, and a feeler is moved into a path of a stop carried by the cradle to operate a switch to de-energize the motor and apply the brake, to stop the cradle within approximately three degrees of the given position. This series of operations results in movement of a second feeler to determine if the cradle is within the predetermined angular distance of the given position and then set up a series of operations, the first being to positively move the cradle the remaining distance to bring it to the given position, the next to lock the cradle in the given position and finally, to operate a plug moving means to cause insertion of an electrical plug in an electrical socket carried by the cradle.

Other objects and advantages will be apparent from the following detailed description when considered in conjunction with the accompanying drawings wherein:

Figs. 1 and 2 when placed together, one (1) above the other (2), will illustrate schematically the control system.

In the schematic illustration of the control system, a cradle 10 with a take-up reel 11 is shown at different locations to illustrate, in one instance, suitable recesses 12 for latches or spud locks 14, a button or projection 15 at a given location for engagement with a feeler 16 and pivotal L-shaped stops 17 and 18 at other locations to be engaged by a roller 19 of another feeler or switch arm 20. The stops 17 and 18 are to be used singly depending upon the direction of rotation of the cradle and their pivotal supports permitting one of the stops to be moved by the roller 19 without actuating the feeler 20 if the roller should be moved outwardly between the stops.

At another illustration of the cradle 10 and reel 11, the power means for driving the cradle is represented by a motor 22 having a pinion 23 mounted on its shaft 24, the pinion driving a gear 25 to drive a ring gear, not shown, mounted on the cradle 10. At another position, the shaft 24 is shown with a brake drum 26 mounted thereon and a brake band 27 operable against the brake drum to stop the drive shaft 24 and the cradle 10.

A start switch 30, when closed, completes a circuit from one line 31 of a 110 v.-60 c.p.s source of electrical energy, through line 32, motor 22, line 33, closed start switch 30, closed stop switch 34, to connection 35 of the other line 36 of the 100 v.-60 c.p.s. source of electrical energy. When this circuit is closed, the cradle is driven at its normal operating speed, but when the stop switch 34 is operated to open the circuit, another circuit is completed to operate the brake. This circuit is traced from line 31 at connection 38 through closed limit switch 39, winding 40, through lower contacts of stop switch 34, closed lower contacts of brake relay 41, to line 36. Energization of winding 40 will actuate brake band 27 against brake drum 26 and against the force of a spring 43 which serves to open or free the brake band from the drum when winding 40 is de-energized.

A number of the units are electrically and/or pneumatically operable, the pneumatic means being under the control of one or the other of two pressure control valves 45 and 46 for controlling air under pressure from a supply line 47 to fluid lines 48 and 49. A positioning switch 50, which is a momentary contact switch when actuated manually, will start the control system. The switch 50 completes a circuit from line 31 through a closed winding 51 of a valve operating relay 52 to line 36. The winding 51, when energized, will close contact 53 to complete a circuit from line 31 through winding 54 of valve 55, through closed contact 53 to line 36.

The contact 53 whether closed by winding 51 or opened by winding 56 will remain in these respective positions until moved by one of the windings. Therefore, the moment winding 51 is energized, the position switch 50 may be released.

A spring 58 of the valve 55 normally holds the valve in the position shown to allow air to exhaust from a cylinder 59 back of a piston 60 and under the force of a spring 61, the air exhausting, as indicated at 62, through an exhaust line 63.

When the winding 54 is energized, the valve is operated against the pulling force of the spring 58 to connect a fluid line 64 from line 49 through line 65 to the cylinder 59. This action on the piston 60, against the force of its spring 61, will cause the piston to move a carriage 66 outwardly, to the right, the piston rod 67 being secured to the carriage 66. The feeler 20, with its roller 19, is a part of a switch 68 which is held open by suitable means such as a spring and may be closed when the roller 19 engages the stop 17 or 18 and is moved thereby.

However, before the switch 68 is closed, other operations take place. Movement of the carriage 66 to the right moves switch 70 from its contact 71 to its contact 72 completing a circuit through a winding 73 of a brake relay 41 to open the bottom contacts thereof and close the top contacts. This completes a circuit from line 31 through line 32, motor 22, through the top contacts of relay 41, through a control unit 75 to line 36. The control unit 75 causes driving of the motor 22 at approximately 1½ revolutions per minute which is defined as a slow speed in comparison to the normal operating speed.

The opening of the bottom contacts of relay 41 results in opening a circuit from line 31, at connection 38, through closed switch 39, winding 40, the closed bottom contacts of the stop switch 34, through line 76, the previously closed bottom contacts of the brake relay 41 to line 36 at connection 77. Through this action, the releasing of the brake by de-energization of the winding 40 and freeing of the spring 43 to open the brake and switch 78 and energization of the motor 22 at the slow speed to rotate the cradle.

The roller 19 of the feeler 20 has been positioned in the path of the stop 17 if the cradle is rotating counterclockwise, or the stop 18 if the cradle is rotating clockwise, to be actuated thereby the moment the cradle is within a predetermined angular position of the given position in which it is to be located for loading or unloading. When the cradle reaches this first position and the selected stop 17—18 has actuated the feeler 20 and closed the switch 68, a series of events will occur momentarily to stop the cradle within approximately three degrees of the given position.

When the switch 68 is closed, the winding 56 of the valve relay 52 is energized to open the contact 53, de-energizing the winding 54, permitting spring 58 to return the valve 55 to its normal position, exhausting air from cylinder 59 and conditioning spring 61 to return the carriage 66 to its normal position, moving switch 70 from contact 72 to contact 71. This action of the switch 70 de-energizes the brake relay 41, opening the circuit defined as a slow moving drive of the motor 22 and completing the circuit through winding 40 to apply the brake to stop the cradle.

Closing of contact 71 will complete a circuit from line 31 through switch 70, contact 71, winding 80, of a time delay unit 81 to line 36. In the present instance, the unit 81 is operated after a three-second delay to complete a circuit from line 31, through closed contact 82 of the unit 81, through a winding 83 of a time delay unit 84 to line 36. In the present instance, after three seconds, a normally closed contact 85 of the unit 84 is opened, but during those three seconds when the contact 85 is held closed, a circuit is completed from line 31 through closed contact 82 of unit 81, connection 86, normally closed contact 85 of unit 84, and winding 87 of valve 88 to line 36.

The valve 88 is held normally in the position shown by a spring 89 where air under pressure may escape from a cylinder 90 back of a piston 91 through an exhaust line 92'. However, when the winding 87 is energized, the valve 88 is operated to permit air under pressure to flow from line 49 through line 92, the valve 88 through line 93 into the cylinder 90. This action forces the piston 91 outwardly against its spring 94 to move a carriage 95 outwardly toward the cradle 10.

The feeler 16, in this instance, is a part of a switch 97 normally held by suitable means such as a spring against its contact 98 but movable to engage its contact 99, if the projection 15 is in a position to be engaged by the feeler providing the cradle is within the angular distance from the given position. When the feeler 16 engages the projection 15 and is actuated through this action of the carriage 95, a circuit is completed from line 31, through switch 97, contact 99, winding 100, closed switch 78, to line 36. Energization of winding 100 operates valve 101 to the right causing air under pressure from line 48 through line 102, the valve 101 to flow through line 103 to cylinder 104 back of piston 105 and, at the same time, connect line 106 from the cylinder in front of the piston to be connected to an exhaust line 107.

The portion of the cradle 10, adjacent the cylinder 104, is provided with a V-shaped groove 109 having a curved inner portion 110 of a radius equal that of a roller 111, mounted on the outer end of a piston rod 112 of the piston 105. The piston rod 112 is of a suitable size and is guided in its movement by suitable means 114 to cause the roller 111 to engage either tapered surface of the groove 109 and cause final turning of the cradle, to move the cradle to the given position which occurs in movement of the roller 111 to the curved apex of the tapered surfaces of the groove.

A carriage 116, connected to the piston rod 112, is movable therewith to move a rod 117, to open switch 39, to open the circuit through winding 40, to free the spring 43, to open the brake for the final movement of the cradle. The cradle also moves a switch 118 toward the cradle. The switch 118 has a projection or feeler 119 adapted to engage an element 120 carried by the cradle 10 and moved with the cradle into a position to be engaged by the feeler 119 when the cradle has been moved to the given position. Therefore, when the desired result has been accomplished, when the cradle has been moved to the given position, the feeler 119 will engage the element 120 and move the switch from its contact 121 to its contact 122. While the switch 118 engages the contact 121, a winding 124 is energized through a circuit from line 31 through switch 118, contact 121, winding 124, to line 36. However, when this circuit is opened, another circuit is closed from line 31 through switch 118, contact 122, winding 125, to line 36, moving the valve 126 to allow air under pressure from line 48 to operate piston 127 from its position, held by the energization of winding 124, where the latches 14 are held open to the position where the latches 14 are moved into their recesses 12 to secure the cradle against movement out of the given position.

At the same time, another circuit is traced through switch 118 and contact 122, through winding 130, normally closed switch 131, to line 36. Energization of winding 130 moves valve 132 from its normal position, where it is held by a spring 133, to a position where fluid from line 49 through line 134 will enter cylinder 135 back of piston 136 to force a plug 137, for electrical circuits, into inter-engagement with a socket 138 which has been brought into alignment with the plug by rotation of the cradle into the given position.

*Operation*

In following the operation of the control system, it should be understood that this system begins its operation after the cradle has been brought to a stop from its normal operating speed, the motor de-energized and the brake applied. Furthermore, the massive weight of the cradle, together with the heavy reel particularly when loaded with cable, renders it impossible to bring the cradle to a stop within a small controllable distance of a zero or given position following the driving of the cradle at the normal high operating speed. Therefore, to position the cradle accurately and efficiently and also automatically, after the momentary pressing of the position switch, it is necessary for the cradle to be stopped. Furthermore, as the brake means is operated automatically to stop the cradle the moment the motor is de-energized, the control system must also control the brake during the initial action to bring the cradle to within a predetermined angular distance of the given position where the cradle is to be stopped to efficiently operate the reel clamping means, to free the reel for removal from the cradle, and the loading of a new reel in the cradle followed by the operation of the clamping means.

The clamping means is driven by a power unit receiving its electrical energy through the plug 137 and the socket 138 which can be inter-connected only when the cradle is at the given position. The actions of the control system are automatic the moment the positioning switch 50 is closed momentarily to cause the carriage 66 to move outwardly, completing circuits to energize the motor, to drive it at the slow speed of approximately 1½ revolutions per minute, release the brake to permit this slow driving action, move the feeler 20 to position its roller 19 in the path of the selected stop 17—18, so that the switch 68 will be closed the moment the cradle reaches a predetermined angular position.

In the present instance, it has been found that this predetermined distance is approximately 10° from the zero or given position. The interval of de-energizing the motor 22 and the application of the brake will allow the cradle to come within approximately 3° of the given position, which will locate the projection 15, to be engaged by the feeler 16, to bring about operation of the other units. Also, this angular position where the cradle is stopped, will locate the roller 111 within the area of the notch or recess 109 so that when operated, it will complete the rotary motion of the cradle with the brake released to cause the cradle to reach its given position. When this has occurred, the feeler 119 engages the element 120, operates switch 118 to close the latches or locks 14 and to simultaneously operate the plug 137 to engage the socket 138.

After the interval of unloading a full reel and loading an empty reel in the cradle, the operator, after clamping the reel in position, may operate the start switch 30. This action causes completion of a circuit through a unit 140 energized by the closing of the start switch, to complete a circuit from line 31 through unit 140, winding 141 of valve 101, to line 36.

Energization of the winding 141 results in resetting the carriage 116 to remove the roller 111 from the recess 109 and the removal of the plug 137 from the socket 138. The other units are also reset, for example, the carriage 95 is given a three-second limit for its action to move the feeler 16 into engagement with the projection 15, after which contact 85 is opened to allow spring 89 to return the valve 88 to its normal position. Also, the carriage 66 is returned to its normal position after the switch 68 has been operated to complete the circuit through the winding 56.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. A control system, for conditioning a cradle of a cable strander for unloading from and loading therein take-up reels at a given position after de-energizing a motor which has been driving the cradle at a normal operating speed and under the control of circuits jointly controlled by start and stop switches to render a brake active to stop the cradle when the motor is de-energized, comprising a positioning switch operable closed, a projection in a predetermined position on the cradle movable in a path therewith, a first carriage movable toward and away from the cradle, means operated by closing of the positioning switch to move the carriage toward the cradle, means responsive to the movement of the carriage toward the cradle to energize the motor at a speed slower than the normal operating speed and release the brake, a feeler movably supported by the carriage and movable therewith in the path of the projection to be actuated thereby when the cradle is within a predetermined angular distance of the given position, means responsive to the movement of the feeler by the projection to cause movement of the carriage away from the cradle, means responsive to movement of the carriage away from the cradle to de-energize the motor and actuate the brake to stop the cradle, a second projection on the cradle being located at an operating position when the cradle is within a predetermined angular distance of the given position, a second carriage, a second feeler movable with the second carriage and relative thereto, means responsive to movement of the first carriage away from the cradle to move the second carriage toward the cradle to cause the second feeler to engage the second projection and be actuated thereby, and means responsive to the movement of the second feeler by the second projection to cause movement of the cradle to the given position.

2. A control system according to claim 1 in which the last named means includes a notch with tapered surfaces disposed in the cradle and disposed at a given location when the cradle is within a predetermined distance of the given position, an element, means responsive to the second feeler when moved relative to the second carriage to cause movement of the element into the groove to move the cradle to the given position.

3. A control system according to claim 2 in which a third carriage is mounted to be moved with the element toward and away from the cradle, a normally closed switch in a circuit normally closed to apply the brake to stop the cradle, and means movable with the third carriage toward the cradle to open the normally closed switch to cause freeing of the brake.

4. A control system according to claim 3 in which latches are operable away fom the cradle to free the cradle for rotation and operable to engage the cradle to lock it in the given position, and means movable with the third carriage and actuated when the element has moved the cradle to the given position to cause movement of the latches into locking engagement with the cradle.

5. A control system according to claim 3 in which an electrical socket is movable with the cradle and is disposed at a given location when the cradle is in the given position, an electrical plug mounted externally of the cradle and in alignment with the socket when in the given location, and means movable with the third carriage to cause movement of the plug into engagement with the socket when the cradle is in the given position.

References Cited in the file of this patent

UNITED STATES PATENTS

| 1,636,466 | Edwards et al. | July 19, 1927 |
| 2,366,145 | Larmuth | Dec. 26, 1944 |
| 2,454,329 | Merwin et al. | Nov. 23, 1948 |